United States Patent [19]
Kobayashi et al.

[11] Patent Number: 4,879,726
[45] Date of Patent: Nov. 7, 1989

[54] SPREAD SPECTRUM COMMUNICATIONS SYSTEM

[75] Inventors: Masaki Kobayashi; Yoshio Itoh, both of Tokyo; Hiroji Kusaka, 173, 1-cho, Hojo-machi, Sakai-shi, Osaka, 591, all of Japan

[73] Assignees: Oki Electric Industry Co., Ltd., Tokyo; Hiroji Kusaka, Osaka, both of Japan

[21] Appl. No.: 104,889

[22] Filed: Oct. 6, 1987

[30] Foreign Application Priority Data

Oct. 8, 1986 [JP] Japan ............................... 61-238125

[51] Int. Cl.⁴ ............................................ H04K 1/00
[52] U.S. Cl. ...................................................... 375/1
[58] Field of Search ............................. 380/34; 375/1

[56] References Cited

U.S. PATENT DOCUMENTS

| | | | |
|---|---|---|---|
| 4,121,159 | 10/1978 | Lampert | 375/1 |
| 4,486,850 | 12/1984 | Hyatt | 364/726 |
| 4,630,283 | 12/1986 | Schiff | 375/1 |
| 4,701,934 | 10/1987 | Jasper | 375/1 |
| 4,760,586 | 7/1988 | Takeda | 375/1 |

FOREIGN PATENT DOCUMENTS 2094593  9/1982  United Kingdom .

OTHER PUBLICATIONS

"Performance Criteria for Spread Spectrum Communications", by Ristenbatt, et al., IEEE Transactions on Communications, vol. COM-25, No. 8, (Aug., 1977) pp. 756-762.

"A Spectral Analysis of M-ARY Direct Sequence Spread-Spectrum Multiple Access Communications Systems", by Kusaka, et al., IEEE Transactions on Communications, vol. COM-31, No. 4, (Apr. 1983), pp. 541-546,

*Primary Examiner*—Salvatore Cangialosi
*Attorney, Agent, or Firm*—Spencer & Frank

[57] ABSTRACT

In a spread communications systems, a filter is inserted in a transmitter and a receiver, respectively. The filter in the transmitter is an FIR filter and the filter in the receiver has a characteristic inverse to that of the FIR filter.

19 Claims, 7 Drawing Sheets

SPREAD SPECTRUM COMMUNICATIONS SYSTEM

BACKGROUND OF THE INVENTION

This invention relates to a spread spectrum communications system, more particularly to a system comprising a transmitter and a receiver linked by a communication channel.

Applications of communications systems employing the spread spectrum (SS) technique are growing in a wide range of fields, including mobile communications and satellite communications, because of the security of SS systems, their resistance to jamming, their compatibility with other existing communications systems, and other features.

Figure 2:
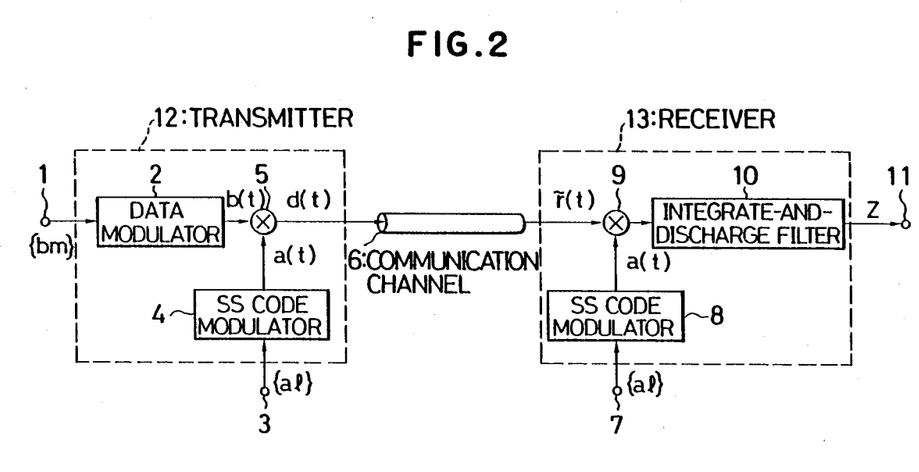
FIG. 2 is a block diagram of a spread spectrum communications system of the prior art.
Figure 3A:
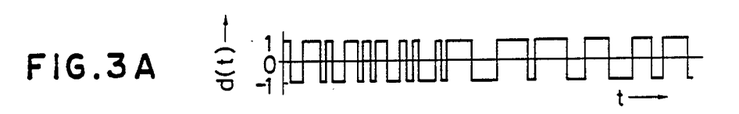
FIG. 3A through 3E and FIG. 4A through 4D show signal waveforms at various points in the embodiment in FIG. 1.
Figure 3B:
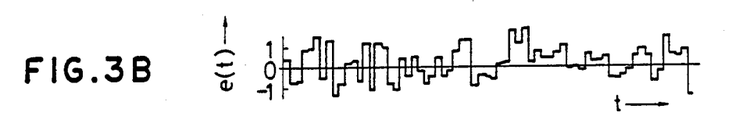
Figure 3C:
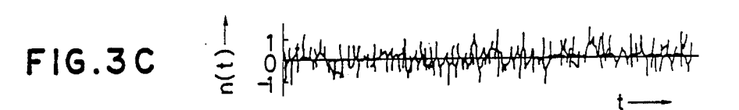
Figure 3D:
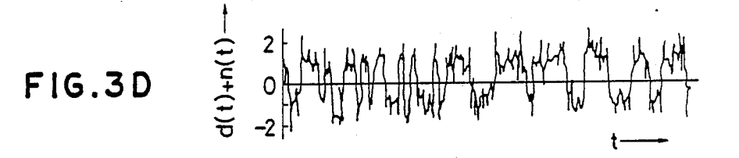
Figure 3E:
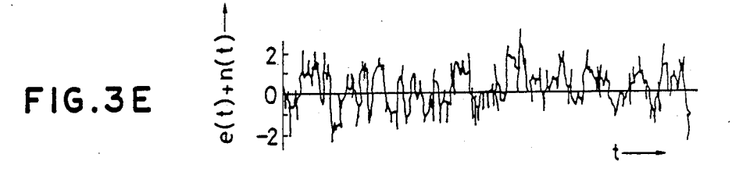

FIG. 2 shows an example of a conventional baseband SS communications system. The communications system in this figure comprises a transmitter 12 and a receiver 13 linked by a communication channel 6. The transmitter 12 comprises a data modulator 2 for modulating transmit data received from an input terminal 1, an SS code modulator 4 for modulating a spread spectrum (SS) code received from an input terminal 3, and a multiplier 5 for multiplying the output from the data modulator 2 and the output from the SS code modulator 4 together. The receiver 13 comprises an SS code modulator 8 for modulating an SS code received from an input terminal 7, a multiplier 9 for multiplying the signal received from the communication channel 6 and the output from the SS code modulator 8 together, an integrate-and-discharge filter 10, and an output terminal 11.

The operation of this SS communications system will be described next. The explanation begins with the operation of the transmitter 12.

A series of transmit data $\{b_m\}$ (where $m = -\infty, \ldots, -1, 0, 1, \ldots, +\infty$) is input in sequence from the input terminal 1 and converted by the data modulator 2 to the transmit data signal:

$$b(t) = \sum_{m=-\infty}^{+\infty} b_m g(t - mT) \quad (1)$$

wherein $b_m$ satisfies the relation $b_m \in \{-A, A\}$, A being a positive real number, and $g(t)$ is the data pulse waveform:

$$g(t) = \begin{cases} 1 & \text{if } 0 \leq t < T \\ 0 & \text{otherwise} \end{cases} \quad (2)$$

where T is the data pulse duration. At the same time, a spread spectrum code (SS code) $\{a_l\}$ with period $N_c$ is input from the input terminal 3 and converted by the SS code modulator 4 to the SS signal $a(t)$:

$$a(t) = \sum_{l=-\infty}^{\infty} a_l g_c(t - lT_c) \quad (3)$$

where $a_l \in \{-1, 1\}$ and $g_c(t)$ is the SS code pulse waveform:

$$g_c(t) = \begin{cases} 1 & \text{if } 0 \leq t < T_c \\ 0 & \text{otherwise} \end{cases} \quad (4)$$

$T_c$ is the duration of the SS code pulse and satisfies the relation $N_c = T/T_c$. The transmit data signal $b(t)$ and the SS signal $a(t)$ are multiplied together in the multiplier 5 and the resulting output $d(t)$ is sent on the communication channel 6:

$$d(t) = a(t)b(t) = \sum_{m=-\infty}^{\infty} \sum_{l=0}^{N_c-1} a_l b_m g_c(t - (mN_c + l)T_c) \quad (5)$$

Next, the receiver 13 performs the following process. First it receives the transmitted signal $\bar{r}(t)$ via the communication channel 6. It also inputs an SS code $\{a_l\}$ (the same code as used in the transmitter) with period $N_c$ from the input terminal 7. This SS code is converted by the SS code modulator 8 to exactly the same SS signal $a(t)$ as used in the transmitter, described by Eq. (3). The multiplier 9 multiplies the signals $\bar{r}(t)$ and $a(t)$ together, and the resulting output $\bar{r}(t)a(t)$ is input to the integrate-and-discharge filter 10, the output $\bar{Z}$ from which is used to restore the original transmit data series $\{b_m\}$.

The spread spectrum communications system described above suffers from the following problems.

The power spectrum density of the signal $d(t)$ transmitted to the communication channel 6, given by Eq. (5), has comparatively large peak values, as shown in the *Denshi Tsushin Gakkai Rombunshi (B)*, Vol. J66-B, 11 (November 1983), pp. 1362–1369. It therefore interferes strongly with other existing communications systems. The above system also provides inadequate security, despite the listing of security as a feature of SS communications systems. Using pulse detector receiving equipment, for example, it is comparatively easy to intercept the transmission even without knowing the SS code $\{a_l\}$.

SUMMARY OF THE INVENTION

An object of the present invention is to eliminate these problems in the prior art and provide an SS communications system that is highly secure and highly compatible with existing communications systems.

To solve the above problems in a spread spectrum communications system comprising a transmitter that transmits a signal resulting from multiplication of a modulated transmit data signal and a modulated spread spectrum code, and a receiver, linked to the transmitter by a communication channel, that receives the signal transmitted from the transmitter and multiplies it by a modulated spread spectrum signal to restore the original transmit data, in the present invention an FIR filter is inserted in the output section of the transmitter and a filter having a characteristic inverse to that of the FIR filter is inserted in the input section of the receiver.

In a spread spectrum communications system structured according to this invention as above, the means employed by this invention function as follows. The FIR filter functions to reduce the peaks of the power spectrum density of the transmitted signal, and to conceal the transmitted signal in the noise on the communication channel. The filter in the receiver functions to restore the signal received from the transmitter via the communication channel, which has been distorted by the characteristic of the FIR filter, to the original signal by application of the inverse characteristic. In this manner the problems cited above in the prior art can be solved.

DETAILED DESCRIPTION OF THE PREFERRED EMBODIMENTS

Figure 1A:
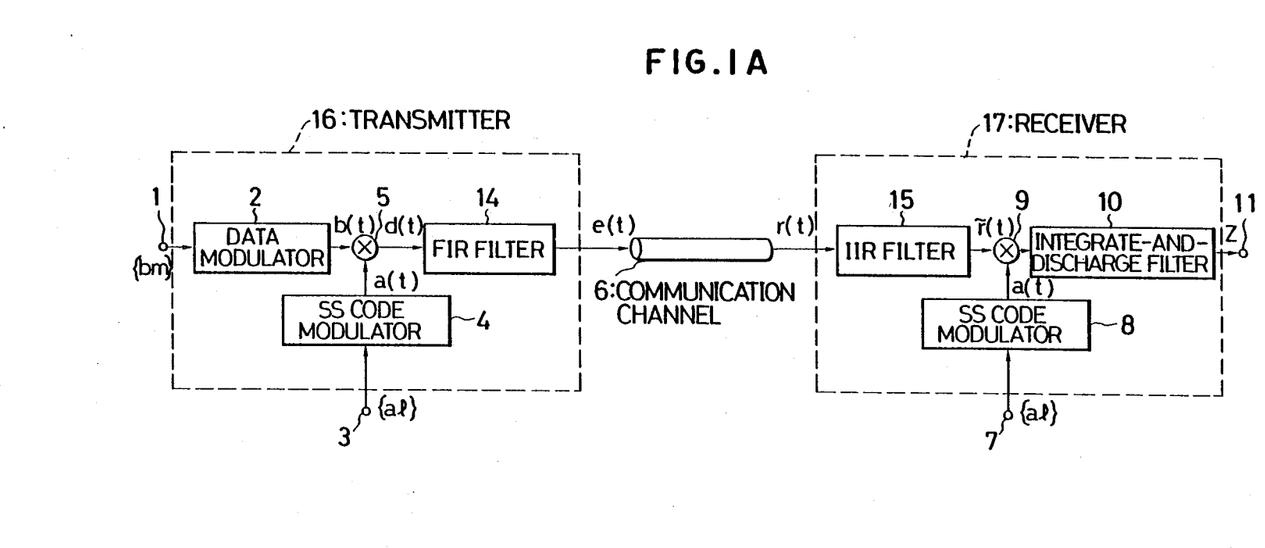
FIG. 1A is a block diagram of an embodiment of the present invention.

FIG. 1A shows a block diagram of an embodiment of this invention. Component elements labeled with the same reference numbers as in FIG. 2 are identical to the corresponding elements in FIG. 2. The SS communications system of this invention comprises a transmitter 16 and a receiver 17 linked by a communication channel 6. The transmitter 16 comprises, in addition to the component elements of the transmitter 12 in FIG. 2, an FIR (Finite Impulse Response) filter 14 connected to the output of the multiplier 5. The receiver 17 comprises, in addition to the component elements of the receiver 13 in FIG. 2, an IIR (Infinite Impulse Response) filter 15 connected to the input of the multiplier 9.

Figure 1B:
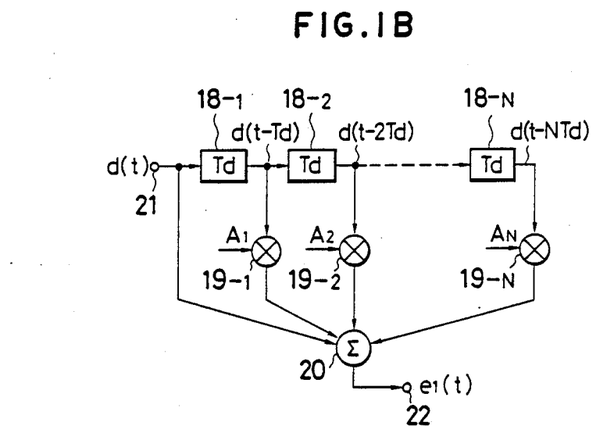
FIG. 1B is a block diagram of the FIR filter in FIG. 1A

FIG. 1B shows the internal structure of the FIR filter 14. As seen in FIG. 1B, the FIR filter 14 comprises delay elements 18–1, 18–2, ..., 18–N, mulltipliers 19–1, 19–2, ..., 19–N, an adder 20, an input terminal 21, and an output terminal 22.

Figure 1C:
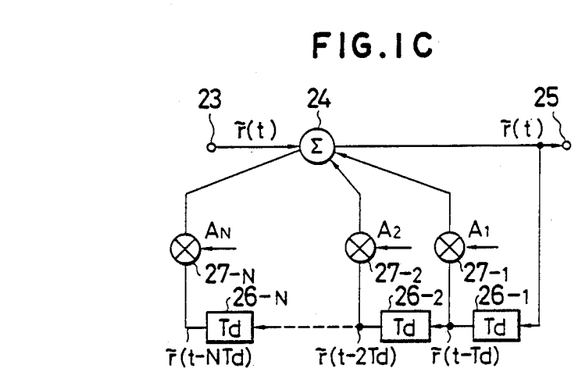
FIG. 1C is a block diagram of the IIR filter in FIG. 1A.

FIG. 1C shows the internal structure of the IIR filter 15. As seen in FIG. 1C, the IIR filter 15 comprises an input terminal 23, an adder 24, an output terminal 25, delay elements 26–1, 26–2, ..., 26–N, and multipliers 27–1, 27–2, ..., 27–N.

The operation of an SS communications system with the above configuration will be described next.

First the operation of the transmitter 16 will be explained. A series of transmit data $\{b_m\}$ (where $m = -\infty, \ldots, -1, 0, 1, \ldots, +\infty$) is input in sequence from the input terminal 1 to the transmitter 16 and converted by the data modulator 2 to the transmit data signal b(t) described earlier:

$$b(t) = \sum_{m=-\infty}^{+\infty} b_m g(t - mT) \tag{1}$$

where $b_m$ and g(t) are the same as in the earlier description. In addition, a spread spectrum signal (SS code) $\{a_l\}$ with a period of $N_c$ is input at the input terminal 3 and converted by the SS code modulator 4 to an SS signal a(t):

$$a(t) = \sum_{l=-\infty}^{\infty} a_l g_c(t - lT_c) \tag{3}$$

where $a_l$ and $g_c(t)$ are the same as described earlier. The transmit data signal b(t) and the SS signal a(t) are multiplied together in the multiplier 5, and the resulting output d(t)

$$d(t) = \sum_{m=-\infty}^{\infty} \sum_{l=0}^{N_c-1} a_l b_m g_c(t - (mN_c + l)T_c) \tag{5}$$

is input to the FIR filter 14. The output signal e(t) from this FIR filter 14 is sent on the communication channel 6.

The process performed by the FIR filter 14 will be explained with reference to FIG. 1B. At time t the transmit data signal d(t) is input at the input terminal 21. This transmit data signal d(t) is applied to the delay element 18–1, which delays it by a time $T_d$. At successive times t the transmit data signal d(t) is shifted successively by the delay elements 18–1, 18–2, ..., 18–N, each of which delays it by a time $T_d$. At time t the outputs $d(t-T_d), d(t-2T_d), \ldots, d(t-NT_d)$ from the delay elements 18–1, 18–2, ..., 18–N are multiplied by $A_1, A_2, \ldots, A_N$ in the multipliers 19–1, 19–2, ..., 19–N, and the outputs $A_1 d(t-T_d), A_2 d(t-2T_d), \ldots, A_N d(t-NT_d)$ from these multipliers are added to the transmit data d(t) in the adder 20. The resulting signal e(t) is sent through the output terminal 22 to the communication channel 6.

Next the operation of the receiver 17 will be described. The signal r(t) received from the transmitter via the communication channel 6 is input to the IIR filter 15. At this point the signal r(t) consists of the signal e(t) sent by the transmitter 16 plus noise n(t) occurring on the communication channel 6:

$$r(t) = e(t) + n(t) \tag{6}$$

Next the output signal $\bar{r}(t)$ from the IIR filter 15 is multiplied in the multiplier 9 by the SS signal a(t), which is identical to the signal used in the transmitter and is described by Eq. (3). The signal a(t) is output from the SS code modulator 8, which inputs from the input terminal 7 an SS code $\{a_l\}$ (identical to the code used in the transmitter) having period $N_c$. The output $\bar{r}(t)a(t)$ from the multiplier 9 is fed to the integrate-and-discharge filter 10, the output $\bar{z}$ from which is used to restore the original data series $\{b_m\}$.

The process performed by the IIR filter 15 will be explained with reference to FIG. 1C. At time t the signal r(t) is input at the input terminal 23. The outputs $\bar{r}(t-T_d), \bar{r}(t-2T_d), \ldots, \bar{r}(t-NT_d)$ from the delay elements 26–1, 26–2, ..., 26–N at time t multiplied by $A_1, A_2, \ldots, A_N$ in the multipliers 27–1, 27–2, ..., 27–N, and the outputs $A_1 \bar{r}(t-T_d), A_2 \bar{r}(t-2T_d), \ldots, A_N \bar{r}(t-NT_d)$ from these multipliers are added to the signal r(t) in the adder 24. The output signal $\bar{r}(t)$ from the adder 24 is sent to the output terminal 25 and is also input to the delay element 26–1, so that as time t progresses the signal is shifted successively by the delay elements 26–1, 26–1, ..., 26–N.

The operation of an embodiment of the present invention has been described. Next the operation of this embodiment will be analyzed. As already explained, the FIR filter 14 and the IIR filter 15 have the same order N. The delay time $T_d$ of the delay elements 18-1, 18-2, ..., 18-N in the FIR filter 14 is also equal to the delay-time $T_d$ of the delay elements 26-1, 26-2, ..., 26-N of the IIR filter 15. The coefficients $A_1, A_2, ..., A_N$ of the multipliers 19-1, 19-2, ..., 19-N of the FIR filter 14 are also designed to be identical to the coefficients $A_1, A_2, ..., A_N$ of the multipliers 27-1, 27-2, ..., 27-N of the IIR filter 15. The FIR filter 14 and IIR filter 15 are accordingly inverse filters. This means that if $H_F(f)$ is the transfer function of the FIR filter 14 and $H_I(f)$ is the transfer function of the IIR filter 15, then the following relation holds:

$$H_F(f) H_I(f) = 1 \qquad (7)$$

If $h_I(t)$ is the impulse response of the IIR filter 15, then the output signal $\tilde{r}(t)$ of the IIR filter 15 is:

$$\tilde{r}(t) = d(t) + \int_{-\infty}^{\infty} n(\tau) h_I(t-\tau) d\tau \qquad (8)$$

Hence only the noise $n(t)$ occurring on the communication channel 6 is affected by the IIR filter 15. If the receiver 17 is synchronized, the output signal $\tilde{Z}_m$ from the multiplier 9 corresponding to the transmitted data $b_m$ can be expressed as:

$$\tilde{Z}_m = \int_{mT}^{(m+1)T} \tilde{r}(t) a(t) dt = \tilde{v}_{s,m} + \tilde{v}_{N,m} \qquad (9)$$

where $\tilde{Z}_{s,m}$ and $\tilde{Z}_{N,m}$ are:

$$\left.\begin{array}{l}\tilde{v}_{s,m} = b_m T \\ \tilde{v}_{N,m} = \int_{mT}^{(m+1)T} \left[ \int_{-\infty}^{\infty} n(u) h_I(t-u) du \right] a(t) dt \end{array}\right\} \qquad (10)$$

Let $\sigma_{S,m}^2 = E[\tilde{Z}_{s,m}^2]$ and $\sigma_{N,m}^2 = E[\tilde{Z}_{N,m}^2]$ (where $E[.]$ denotes the set average), and assume that the noise $n(t)$ on the communication channel is a white Gaussian noise with power spectrum density $No/2$. It follows that:

$$\left.\begin{array}{l}\sigma_{s,m}^2 = (AT)^2 \\ \sigma_{N,m}^2 = \frac{NoTT_c}{2} \int_{-\infty}^{\infty} [Sa(\pi f T_c)]^2 |H_I(f)|^2 S^{(1)}(f) df \end{array}\right\} \qquad (11)$$

where $Sa(x)$ and $S^{(1)}(f)$ are given as below:

$$\left.\begin{array}{l}Sa(x) = \frac{\sin x}{x} \\ S^{(1)}(f) = 1 + \frac{2}{Nc} \sum_{k=1}^{Nc-1} C_{1,1}(k) \cos(2\pi k f T_c)\end{array}\right\} \qquad (12)$$

the coefficients $C_{1,1}(k)$ are as follows:

$$C_{1,1}(k) = \begin{cases} \sum_{l=0}^{Nc-k-1} a_l a_{l+k} &, k = 0, 1, 2, ..., Nc - 1 \\ 0 &, k \geq Nc \end{cases} \qquad (13)$$

From the above, the signal-to-noise ratio (SNR) of the receiver 17 is:

$$SNR = \qquad (14)$$

$$\frac{2A^2T}{No} \left\{ T_c \int_0^\infty [Sa(\pi f_c T_c)]^2 |H_I(f)|^2 S^{(1)}(f) df \right\}^{-1}$$

A design procedure for the FIR filter 14 and the IIR filter 15 will be described next. The order N, the delay time $T_d$ or the delay elements 18-1, 18-2, ..., 18-N and the delay elements 27-1, 27-2, ..., 27-N, and the multiplier coefficients $A_1, A_2, ..., A_N$ of the FIR filter 14 and IIR filter 15 used in this invention correspond to the order N, the sampling interval $T_d$, and the coefficients $A_n$ derived from the Yule-Walker equation for the AR model of the time series generated by the SS signal, and the FIR filter 14 and the IIR filter 15 are inversely related as seen above. Setting:

$$\left.\begin{array}{l}E[b_m] = 0 \\ E[b_m b_{m+p}] = R(p)\end{array}\right\} \qquad (15)$$

(where $P = 0, 1, 2, ...$)

let us define the following function $M(f)$ for the transmit data signal:

$$M(f) = R(o) + 2 \sum_{p=1}^{\infty} R(p) \cos(2\pi p f T) \qquad (16)$$

The continuous spectrum component $Sc(f)$ of the transmit data signal $d(t)$ is determined by this function $M(f)$ and the functions $S^{(1)}(f)$ defined in Eq. (12):

$$S_c(f) = T_c [S_a(\pi f T_c)]^2 M(f) S^{(1)}(f) \qquad (17)$$

The auto-correlation of the transmit data $d(t)$ can be found from the inverse Fourier transform of $Sc(f)$. Suppose the transmit data series $\{b_m\}$ is statistically independent (meaning that $R(p) = 0$ for $p = 1, 2, ...$). Then if $|\tau| = (k+\xi)T_c$ (where $0 \leq \xi < 1$), the auto-correlation function $R^{(1)}(\tau)$ of $d(t)$ is:

$$R^{(1)}(\tau) = \begin{cases} \frac{R(o)}{Nc} [(1-\xi)C_{1,1}(k) + \xi C_{1,1}(k+1)], \\ \qquad\qquad 0 \leq k \leq Nc - 1 \\ 0, \qquad k \geq Nc \end{cases} \qquad (18)$$

The normalized auto-correlation function $r^{(1)}(\tau) = R^{(1)}(\tau)/R^{(1)}(0)$ can be used to find the multiplier coefficients $A_1, A_2, ..., A_N$ of the FIR filter 14 and the IIR filter 15 by solving the Yule-Walker equation:

$$r^{(1)}(k) = -\sum_{n=1}^{N} A_n r^{(1)}(k-n), k = 1, 2, \ldots, N \quad (19)$$

The solution can be obtained by the well-known Levinson-Durbin algorithm. If the delay time of the delay elements 18-1, 18-2, ..., 18-N and 26-1, 26-2, ..., 26-N of the FIR filter 14 and the IIR filter 15 is written as $T_d = \xi T_c$ (where $\xi = 1/q$, $q = 1, 2, \ldots$), then $r^{(1)}(k)$ is a discrete value that can be expressed as $r^{(1)}(k) = r^{(1)}(\tau)$ $1\tau = kT_d$.

The solution of the equation (19) gives coefficients An (n=1 to N) that minimizes the average of the power of the output of the transmitter 16 which is proportional to $e^2(t)$. Minimizing the average power of the output of the transmitter 16 is considered to have the effect of minimizing the peaks in the spectrum of the output of the transmitter, i.e., suppressing, to the greatest degree, the peaks of the spectrum, thereby making it difficult to analyze the features of the signal being transmitted and to intercept it without the SS code. Use of the FIR filter in the transmitter is advantageous in that the values of the coefficients An can be determined unequivocally and relatively easily.

Use of the IIR filter 15 in the receiver 17 in combination with the use of the FIR filter 14 in the transmitter 16 is advantageous in that the IIR filter 15 has the transfer function inverse to that of the FIR filter 14 if the coefficients $A_1$ to $A_N$ of the multipliers 27-1 to 27-N are given the same values as those to the multipliers 19-1 to 19-N.

The IIR filter in the receiver can be replaced by an FIR filter. In this case the coefficients of the multipliers of the FIR filter should be determined such that the transfer function of the FIR filter in the receiver is approximately, if not exactly, inverse to that of the FIR filter in the transmitter. To obtain the exactly inverse relationship between the transfer functions is difficult because the order N. (number of steps) in the FIR filter is finite.

The above has been a description of the design of the FIR filter 14 and the IIR filter 15. The effects of this embodiment of the invention will now be described by presenting examples of specific numerical computations.

Figure 4A:
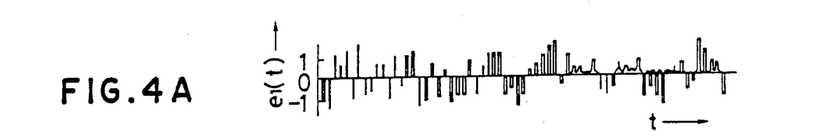
Figure 4B:
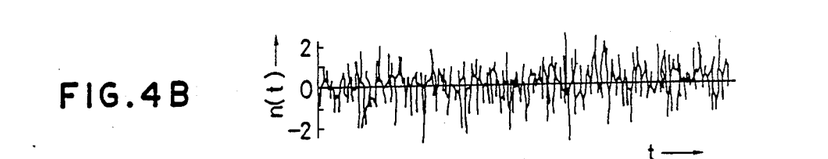
Figure 4C:
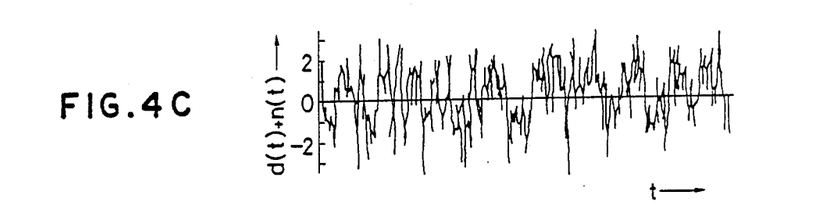
Figure 4D:
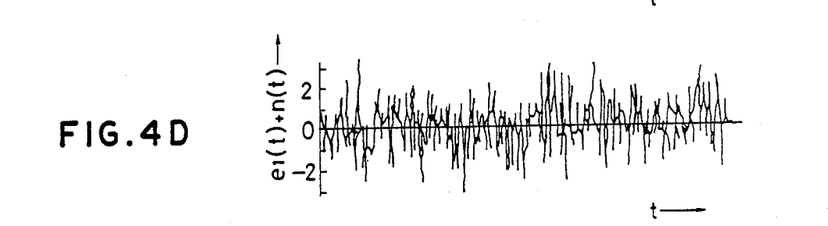

We shall use the well-known Gold code as the SS code {a}, and assume that the noise n(t) on the communication channel is white Gaussian noise with mean value 0 and power spectrum density No/2. If $\xi = 1$ we select a transmission band-width Be of Be=$3f_c$ (where $f_c 1/T_c$), and if $\xi = \frac{1}{3}$ we select Be=$9f_c$. We also assume that there is no distortion of the transmitted and received signals. Let the amplitude A of the transmit data signal b(t) be 1(A=1), the filter order be N=50, and the period of the SS code be $N_c = 127$. FIG. 3A through 3E show the signal waveform at various points under these conditions when $\xi = 1$. FIG. 4A thorugh 4D show the signal waveform at various points under these conditions when $\xi = \frac{1}{3}$. We are assuming that the communication channel noise (Gaussian noise n(t) in FIG. 3 and FIG. 4 has a flat power spectrum density within the postulated transmission bandwidth and is expressed by the constant-amplitude Fourier series:

$$n(t) = \sigma_n \sqrt{\frac{2}{N_N}} \sum_{j=1}^{N_N} \cos(2\pi j f_0 t + \phi_j) \quad (20)$$

where $\sigma_n^2$ is the noise power, $N_N$ is the number of cosine waves, and $\phi_j$ is a uniform random variable on the interval $[0, 2\pi]$, $f_0$ is the fundamental frequency of the Fourier series, determined by the formula Be=$N_N f_0$. The noise power $\sigma_n^2$ is determined by the product of the power of the transmit data signal d(t) with respect to the Gaussian noise power spectrum density and the persistence time (duration) of the SS code pulse, and is given by $A^2 T_c/No$. In the computation the following values were used: $A^2 T_c/No = 10$dB, Be=$3/(\xi Tc)$, $\sigma_n^2 = No Be$, and $N_N = 100$. As can be seen from FIG. 3 and FIG. 4, the signal e(t) output to the communication channel 6 by the SS communications system of this invention is more easily concealed by the noise n(t) on the communication channel than the signal d(t) output to the communication channal 6 by the SS communications system of the prior art.

Figure 5A:
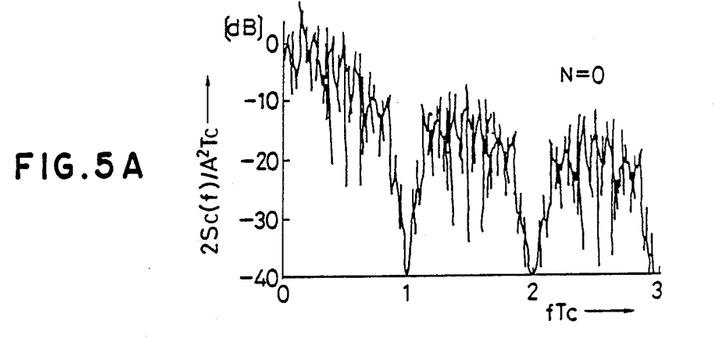
FIG. 5A through 5C describe the power spectrum density of the transmitted signal in the embodiment in FIG. 1.
Figure 5B:
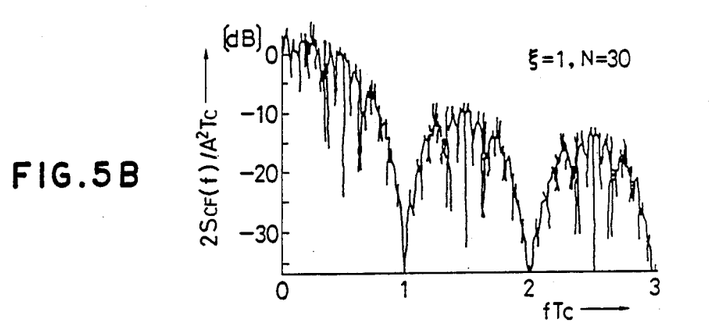
Figure 5C:
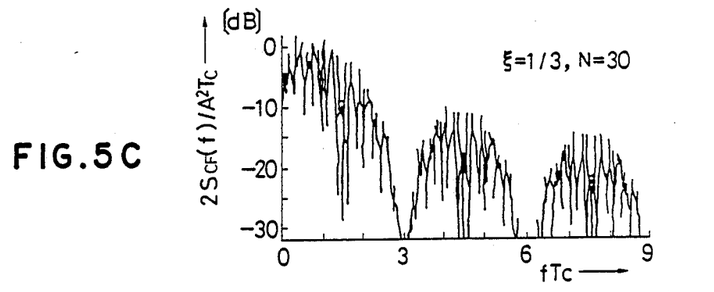

FIG. 5A through 5C show the power spectrum densities of the signals d(t) and e(t). FIG. 5A shows the power spectrum density in the SS communications system of the prior art. FIG. 5B and 5C show the power spectrum density in the SS communications system of the present invention. In FIG. 5B $\xi = 1$ and N=30. In FIG. 5C $\xi = \frac{1}{3}$ and N=30. The power spectrum density $S_{cF}(f)$ of the signal e(t) is $S_{cF}(f) = G_{F,1}^2 S_c(f) |H_F(f)|^2$ for a transmitter gain of $G_{F,1}$ with the transmitted power being $$P_F = G_{F,1}^2 \int_{-\infty}^{\infty} S_c(f) |H_F(f)|^2 df = A^2.$$

As FIG. 5B and 5C indicate, the bandwidth of each lobe in the power spectrum density of e(t) for a given $\xi$ is $1/\xi$ times the corresponding value for $S_c(f)$, indicating a lower density. As the order N of the filter increases, spike-like variations decrease and peak values are reduced. The effects of the FIR filter 14 in suppressing the peak value of the power spectrum density of the transmitted signal is expressed by the index below, which depends on the order N as shown in FIG. 6.

$$\Lambda = 1 - \max[S_c(f)|H_F(f)|^2]/\max[S_c(f)] \quad (21)$$

Figure 6:
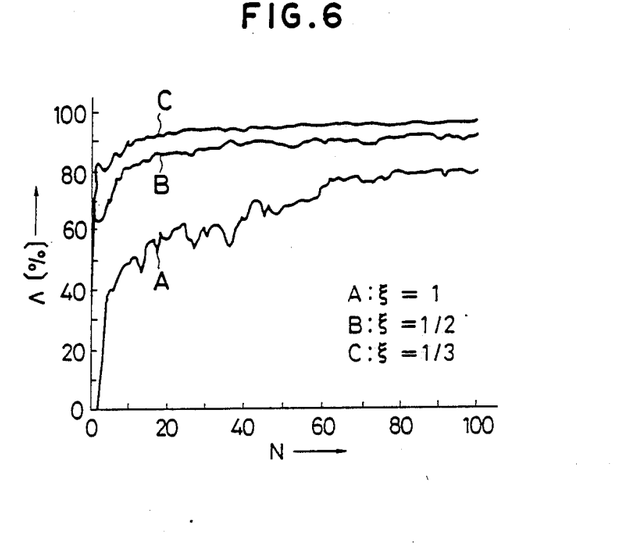
FIG. 6 describes the effect of the FIR filter in suppressing peak values in the power spectrum of the transmitted signal.

Plot A in FIG. 6 is for $\xi = 1$, plot B is for $\xi = \frac{1}{2}$, and plot C is for $\xi = \frac{1}{3}$. FIG. 6 indicates that the peak suppression effect increases with increasingly small values of $\xi$ and increasingly large values of N.

As explained above, this invention, by providing an FIR filter in the output section of the transmitter and an IIR filter in the input section of the receiver, attains greater security than in spread spectrum communications systems of the prior art, and promises to be compatible with other existing communications systems.

What is claimed is:

1. A spread spectrum communications system comprising:
    a transmitter that transmits a signal resulting from multiplication of a modulated data signal and a modulated spread spectrum code; and
    a receiver that is linked to said transmitter by a communication channel and receives said signal transmitted from said transmitter and multiplies it by a modulated spread spectrum signal to restore the original transmit data;

an FIR filter inserted in the output section of said transmitter for processing said signal; and a filter having a characteristic inverse to that of said FIR filter inserted in the input section of said receiver, said FIR filter including multipliers, having predetermined multiplication coefficients selected for suppression of peaks of said signal.

2. A spread spectrum communications system according to claim 1,
wherein said filter inserted in the receiver is an IIR filter.

3. A spread spectrum communications system according to claim 2,
wherein the IIR filter inserted in the receiver has the same order as the FIR filter in the transmitter and coefficients of the multipliers of the IIR filter have the same values as the coefficients of the corresponding multipliers in the FIR filter.

4. A spread spectrum communications system according to claim 1,
wherein said coefficients are selected to minimize the average power of said signal output from said FIR filter.

5. A spread spectrum communications system according to claim 1, wherein said coefficients are selected in accordance with the spread spectrum code to supress the peaks of a signal output from said FIR filter.

6. A spread spectrum communications system according to claim 4, wherein said coefficients are selected in accordance with the spread spectrum code to minimize the average power of a signal output from said FIR filter.

7. A spread spectrum communications system according to claim 1, wherein said FIR filter includes;
an input terminal,
adder means having a first input connected to said input terminal,
a plurality of delay means serially connected from said input terminal to a second input of said adder, and
a plurality of multipliers, the input of each connected between a respective pair of successive delay means in said series and the output of each connected to a respective input of said adder.

8. A transmitter in a spread spectrum communications system, comprising:
means for modulating a data signal:
means for multiplying said modulated data signal with a modulated spread spectrum code and producing an output corresponding to the multiplication product; and
an FIR filter for receiving said output of said multiplying means and for providing a transmit signal, said FIR filter including multipliers having predetermined coefficients selected to suppress the peaks of said signal from said FIR filter.

9. A transmitter according to claim 8, wherein said coefficients are selected to minimize the average power of a signal output from said FIR filter.

10. A transmitter according to claim 8, wherein said coefficients of said multipliers of said FIR filter are selected in accordance with said spread spectrum code.

11. A transmitter according to claim 9, wherein said coefficients of said multipliers of said FIR filter are selected in accordance with the spread spectrum code.

12. A communications system according to claim 8, wherein said output of said multiplying means includes a noise component and a data component;
said data component having a power level greater than said power level of said noise component, said peak suppression serving to fit said data component within said power level of said noise component.

13. A spread spectrum communications system comprising:
a transmitter including:
means for modulating a data signal containing transmit data;
means for multiplying said modulated data signal with a modulated spread spectrum code and for producing an output corresponding to the multiplication product; and
an FIR filter for receiving said output of said multiplying means and producing a transmit signal, said FIR filter including multipliers having predetermined coefficients selected to suppress the peaks of said transmit signal from said FIR filter; and
a receiver linked to said transmitter by a communication channel to receive said transmit signal from said transmitter, said receiver comprising:
a filter having a characteristic inverse to that of said FIR filter, for receiving said signal and supplying an output corresponding thereto; and
means for multiplying said output of said filter in said receiver with a modulated spread spectrum signal to restore the modulated transmit data.

14. A spread spectrum communications system according to claim 13, wherein said coefficients of said multipliers of said FIR filter are selected to minimize the average power of said transmit signal output from said FIR filter.

15. A spread spectrum communications system according to claim 13, wherein said filter in said receiver is an IIR filter.

16. A system according to claim 15, wherein said IIR filter in said receiver has the same order as said FIR filter in said transmitter, has multipliers corresponding to said multipliers in said FIR filter, said coefficients of said multipliers of said IIR filter having the same values as said coefficients of the corresponding multipliers in said FIR filter.

17. A transmitter according to claim 13, wherein said coefficients of said multipliers of said FIR filter are selected to minimize the average power of a signal output from said FIR filter.

18. A spread spectrum communications system according to claim 13, wherein said coefficients of said multipliers of said FIR filter are selected in accordance with the spread spectrum code.

19. A spread spectrum communications system according to claim 17, wherein said coefficients of said multipliers of said FIR filter are selected in accordance with the spread spectrum code.

* * * * *